United States Patent
Booth et al.

(10) Patent No.: US 7,711,900 B2
(45) Date of Patent: May 4, 2010

(54) METHOD, SYSTEM AND PROGRAM PRODUCT FOR EQUITABLE SHARING OF A CAM TABLE IN A NETWORK SWITCH IN AN ON-DEMAND ENVIRONMENT

(75) Inventors: Bruce Booth, Richmond Hill (CA); Mark E. Goodgion, Raleigh, NC (US); Atef O. Zaghloul, Morrisville, NC (US); John H. Zeiger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 11/681,820

(22) Filed: Mar. 5, 2007

(65) Prior Publication Data

US 2008/0222352 A1   Sep. 11, 2008

(51) Int. Cl.
*G06F 12/00* (2006.01)
(52) U.S. Cl. .................. 711/130; 711/131; 711/221; 709/213; 709/215; 709/232
(58) Field of Classification Search ......... 711/129–131, 711/221; 709/213–215, 232
See application file for complete search history.

(56) References Cited

U.S. PATENT DOCUMENTS

| 5,892,912 | A | 4/1999 | Suzuki et al. |
| 6,188,691 | B1 | 2/2001 | Barkai et al. |
| 6,230,231 | B1 | 5/2001 | DeLong et al. |
| 6,457,058 | B1 | 9/2002 | Ullum et al. |
| 6,651,093 | B1 | 11/2003 | Wiedeman et al. |
| 7,007,071 | B1 * | 2/2006 | Brown ................. 709/213 |
| 2005/0220105 | A1 | 10/2005 | Yen et al. |
| 2006/0039378 | A1 | 2/2006 | Medina et al. |

* cited by examiner

*Primary Examiner*—Jasmine Song
(74) *Attorney, Agent, or Firm*—Schmeiser, Olsen & Watts; Arthur J. Samodovitz

(57) ABSTRACT

A method, system and program product for equitable sharing of a CAM (Content Addressable Memory) table among multiple users of a switch. The method includes reserving buffers in the table to be shared, the remaining buffers being allocated to each user. The method further includes establishing whether or not an address contained in a packet from a user is listed in a buffer in the table, if the address is listed, updating a time-to-live value for the buffer for forwarding the packet and, if the address is not listed, determining whether or not the user has exceeded its allocated buffers and whether or not the reserved buffers have been exhausted, such that, if the user has exceeded its allocated buffers and the reserved buffers have been exhausted, the address is not added to the table and the user is precluded from using any additional buffers in the network switch.

20 Claims, 8 Drawing Sheets

METHOD, SYSTEM AND PROGRAM PRODUCT FOR EQUITABLE SHARING OF A CAM TABLE IN A NETWORK SWITCH IN AN ON-DEMAND ENVIRONMENT

FIELD OF THE INVENTION

The present invention relates to a method, system and computer program product for equitable sharing of buffers in a network switch shared by one or more users. More particularly, the present invention relates to a method, system and computer program product for equitable sharing of a finite CAM (Content Addressable Memory) table having a finite buffer size between multiple users of the switch, using a buffer allocation tool or algorithm implemented within the network switch. The buffer allocation tool or algorithm in the network switch, further, mitigates flooding of the CAM table by any one user and also prevents DHCP (Dynamic Host Configuration Protocol) starvation attacks.

BACKGROUND OF THE INVENTION

Business networks, such as, most data center networks share switches between users and/or customers and/or departments, etc. As such, a single user, deliberately or unintentionally, can generate a large number of packets with random MAC (Media Access Control) addresses that fill the CAM (Content Addressable Memory) table in a switch and cause traffic to be flooded. Once the CAM table is full, the traffic is flooded out on all ports, causing network congestion on all segments connected to the switch.

This is known in the literature as a MAC Attack or CAM Table overflow. Once the CAM table is full, the switch is unable to learn any new MAC addresses. Similarly, if a large number of DHCP (Dynamic Host Configuration Protocol) requests are sent, an attacker can exhaust the address space available to the DHCP servers for a given period of time, thus, creating a simple resource starvation attack. As such, there is a need for a business and/or data center to provide a cost-effective way to develop ways to share switches between users and/or customers, while minimizing any external threats.

SUMMARY OF THE INVENTION

In a first aspect of the invention, there is provided a method for equitable sharing of buffers between a plurality of users of a network switch. The method includes reserving a subset number of buffers in an address table in a network switch, the subset number of buffers forming a shared buffer pool and a remaining number of buffers in the data table forming a dedicated buffer pool. Further, the method includes establishing, upon arrival of a packet containing an address corresponding to a respective user of a plurality of users, whether or not the address is listed in a buffer in the data table, if the address is listed in the buffer in the data table, updating a preset time-to-live value for the buffer in the data table and forwarding the packet and if the address is not listed in the buffer in the data table, determining whether or not the respective user has exceeded a preset number of buffers allocated from the dedicated buffer pool and whether or not the subset number of buffers reserved in the shared buffer pool have been exhausted, wherein if the preset number of buffers allocated to the respective user from the dedicated buffer pool and the subset number of buffers reserved in the shared buffer pool have been exhausted, the respective user is precluded from using any additional buffers in the network switch. The method further includes ascertaining the plurality of users to be supported by the network switch and allocating to each user of the plurality of users a preset number of buffers from the dedicated buffer pool in the network switch. Further, the method includes deleting, upon expiration of the preset time-to-live value for the buffer in the data table, the address entered in the buffer and returning the buffer to the shared buffer pool. In an embodiment, the determining step further includes maintaining for each user of the plurality of users a running tally of a total number of buffers in the data table being used by the each user, keeping a running tally of buffers remaining in the shared buffer pool in the data table being used by the plurality of users and comparing the running tally of the total number of buffers maintained for the respective user to the preset number of buffers allocated to the respective user from the dedicated buffer pool. Further, in an embodiment, the determining step further includes incrementing by one, if the running tally of the total number of buffers used by the respective user does not exceed the preset number of buffers allocated to the respective user from the dedicated buffer pool, the running tally of the total number of buffers maintained for the respective user and adding the address to the data table in order to forward the packet. If the running tally of the total number of buffers used by the respective user exceeds the preset number of buffers allocated to the respective user from the dedicated buffer pool, verifying whether or not the subset number of buffers reserved in the shared buffer pool have been exhausted and if it is verified that the subset number of buffers reserved in the shared buffer pool have not been exhausted, allowing the respective user to borrow a buffer from the shared buffer pool to add the address to the data table in order to forward the packet. In an embodiment, the returning step further includes adding one to the running tally of buffers remaining in the shared buffer pool, if the running tally of the total number of buffers for the respective user is greater than the preset number of buffers allocated to the respective user from the dedicated buffer pool and deleting one from the running tally of the total number of buffers for the respective user. In an embodiment, the returning step further includes deleting one from the running tally of the total number of buffers for the respective user, if the running tally of the total number of buffers for the respective user is not greater than the preset number of buffers allocated to the respective user from the dedicated buffer pool and deleting the address entered in the buffer. In an embodiment, the preventing step further includes determining whether or not a prior notification has been sent regarding the subset numbers of buffers reserved in the shared buffer pool being exhausted and, if it is determined that the prior notification has not been sent, sending notification regarding the subset numbers of buffers reserved in the shared buffer pool being exhausted. In an embodiment, a user includes at least one of a port, a plurality of ports, a virtual local area network (VLAN) and a plurality of virtual local area networks (VLANs) and the data table includes a CAM (Content Addressable Memory) table for storing one or more MAC (Media Access Control) addresses.

In another aspect of the invention, there is provided a system for mitigating flooding of an address table in a network switch. The system includes a network switch configured to support a number of users connected on a network, the network switch having an address table with a finite number of buffers for storing therein a plurality of addresses corresponding to addresses available on respective ports in the network switch, each address of the plurality of addresses stored therein having a respective preset time-to-live value. The system further includes a buffer allocation tool configured to reserve a subset number of buffers from the finite number of buffers for creating a shared buffer pool, a remaining number of the finite number of buffers forming a dedicated buffer pool, the buffer allocation tool being further configured to allocate to each user of the number of users a total number of buffers in the address table that includes a preset number of buffers from the dedicated buffer pool and a preset percentage of buffers from the shared buffer pool, the buffer allocation tool being further configured to establish upon arrival of a packet containing an address therein whether or not the address is listed in a buffer in the address table, if the address is listed in the buffer in the address table, the buffer allocation tool being configured to update a preset time-to-live value for the buffer and to forward the packet and if the address is not listed in the buffer in the address table, the buffer allocation tool being configured to determine whether or not the respective user has exceeded the total number of buffers allocated in the address table, wherein if the respective user has exceeded the total number of buffers allocated in the address table, the buffer allocation tool being configured to prevent the respective user from borrowing any additional buffers in the address table in the network switch. In an embodiment, the buffer allocation tool is further configured to maintain a running tally of the total number of buffers in the address table used by each user and to keep a running tally of buffers remaining in the shared buffer pool and is configured to send a notification when the respective user has used up the total number of buffers allocated in the address table. In an embodiment, the buffer allocation tool is further configured to compare the running tally of the total number of buffers in the address table used by the respective user to the preset number of buffers from the dedicated buffer pool allocated to the respective user and, if the running tally of the total number of buffers is less than the preset number of buffers allocated from the dedicated buffer pool to the respective user, to increment by one the running tally of the total number of buffers for the respective user and to add the address to the address table in order to forward the packet. In an embodiment, if the running tally of the total number of buffers for the respective user is greater than the preset number of buffers allocated from the dedicated buffer pool to the respective user, the buffer allocation tool is further configured to verify whether or not the subset number of buffers reserved in the shared buffer pool have been exhausted and, if the shared buffer pool have not been exhausted, to decrease by one the running tally for the shared buffer pool in order to allow the respective user to use a buffer from the shared buffer pool to add the address in the buffer in the address table and to increase by one the running tally of the total number of buffers for the respective user. In an embodiment, the buffer allocation tool is configured to delete the address stored in the buffer in the address table upon expiration of the preset time-to-live value for the buffer and to return the buffer to the shared buffer pool. In an embodiment, the buffer allocation tool is configured to determine whether or not a prior notification has been sent regarding the shared buffer pool being exhausted and, if it is determined that the prior notification has not been sent, sending notification regarding the shared buffer pool being exhausted. In an embodiment, a user includes at least one of a port, a plurality of ports, a virtual local area network (VLAN) and a plurality of virtual local area networks (VLANs) and the data table includes a CAM (Content Addressable Memory) table for storing one or more MAC (Media Access Control) addresses.

In yet another aspect of the invention, there is provided a computer program product for equitable sharing of an address table in a network switch shared by a plurality of users. The computer program product includes a computer readable medium, first program instructions to reserve a subset number of buffers in an address table in a network switch, the subset number of buffers reserved forming a shared buffer pool and a remaining number of buffers in the address table forming a dedicated buffer pool, the address table storing therein a plurality of addresses corresponding to addresses available on respective ports in the network switch, each address of the plurality of addresses stored therein having a respective preset time-to-live value. Further, the computer program product includes second program instructions to allocate to each user of a plurality of users a total number of buffers in the address table that includes a preset number of buffers from the dedicated buffer pool and a preset percentage of buffers from the shared buffer pool. Furthermore, the computer program product includes third program instructions to determine for an address in a packet sent by a respective user among the plurality of users, whether the respective user has exceeded the total number of buffers in the address table allocated and, if yes, to prevent the respective user from using any additional buffers in the address table, the third program instructions comprising instructions to send a notification when the respective user has exceeded the total number of buffers in the address table. In an embodiment, the second program instructions further include instructions to maintain for each user of the plurality of users a running tally of the total number of buffers used by the each user in the address table and to keep a running tally of buffers remaining in the shared buffer pool in the address table. In an embodiment, the third program instructions further include instructions to compare the running tally of the total number of buffers maintained for the respective user to the preset number of buffers allocated to the respective user from the dedicated buffer pool and, if the running tally of the total number of buffers used by the respective user exceeds the preset number of buffers allocated to the respective user from the dedicated buffer pool, to verify that the subset number of buffers in the shared buffer pool has not been exhausted before allowing the respective user to borrow a buffer from the shared buffer pool for adding the address in the address table. In an embodiment, if the running tally of the total number of buffers used by the respective user exceeds the preset number of buffers allocated to the respective user from the dedicated buffer pool and the subset number of buffers in the shared buffer pool has not been exhausted, the third program instructions further include instructions to decrease by one the running tally of buffers remaining in the shared buffer pool and to increase by one the running tally of the total number of buffers for the respective user. In an embodiment, if the running tally of the total number of buffers for the respective user is less than the total number of buffers allocated to the respective user from the dedicated buffer pool, the third program instructions further include instructions to determine to increment by one the running tally of the total number of buffers for the respective user and to add the address to the address table. In an embodiment, the third program instructions further include instructions to delete a respective address entered in a respective buffer, upon expiration of a respective preset time-to-live value for the respective address entered in the respective buffer in the address table and to return the respective buffer to the shared buffer pool. In an embodiment, a user includes at least one of a port, a plurality of ports, a virtual local area network (VLAN) and a plurality of virtual local area networks (VLANs) and the data table includes a CAM (Content Addressable Memory) table for storing one or more MAC (Media Access Control)

addresses. Preferably, each of the first, second and third program instructions are stored on the computer readable medium.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
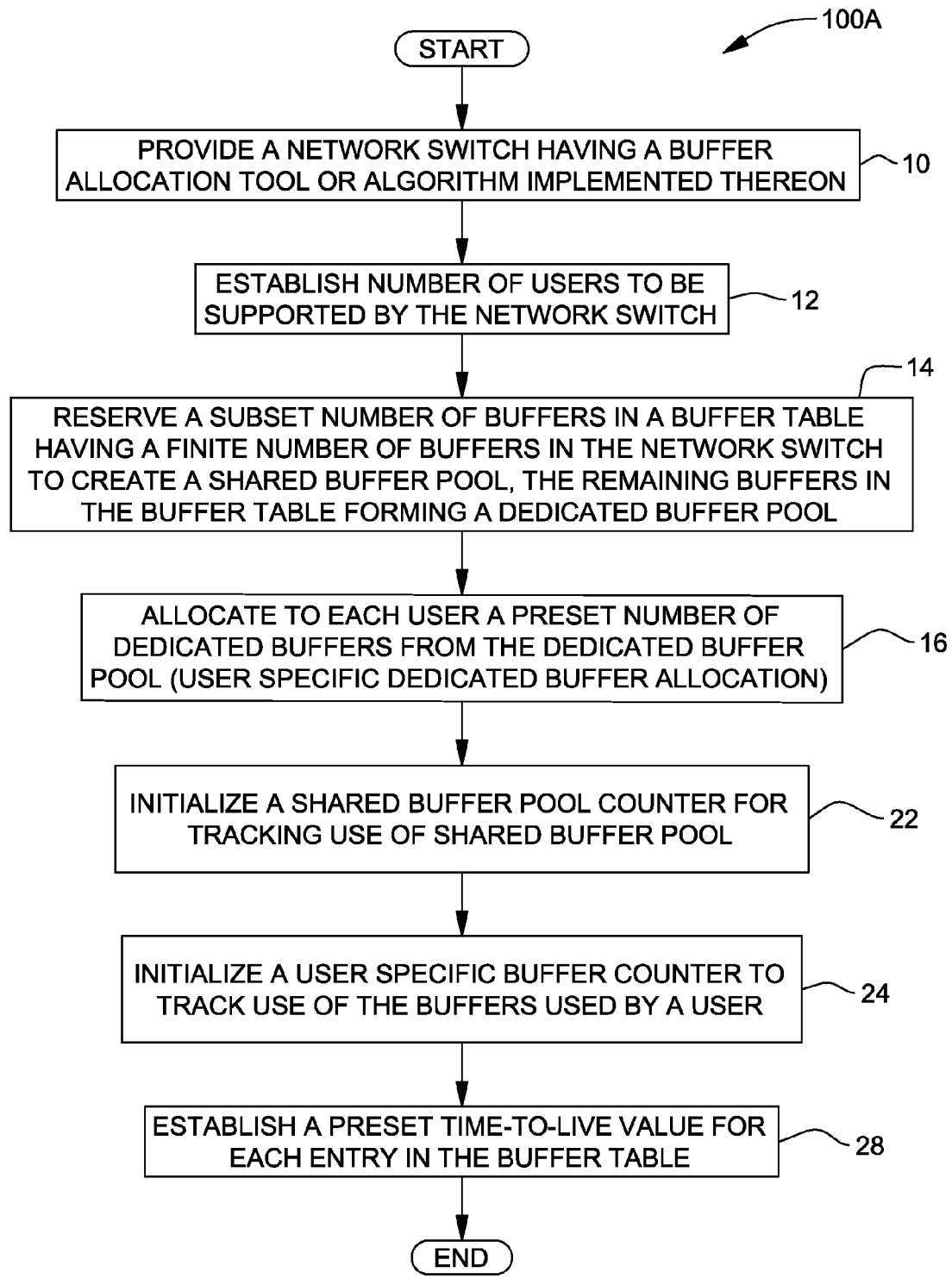
FIG. 1A depicts a flowchart outlining the steps for setting up a process for equitably sharing a CAM table in a network switch that is to be shared by multiple users, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1B:
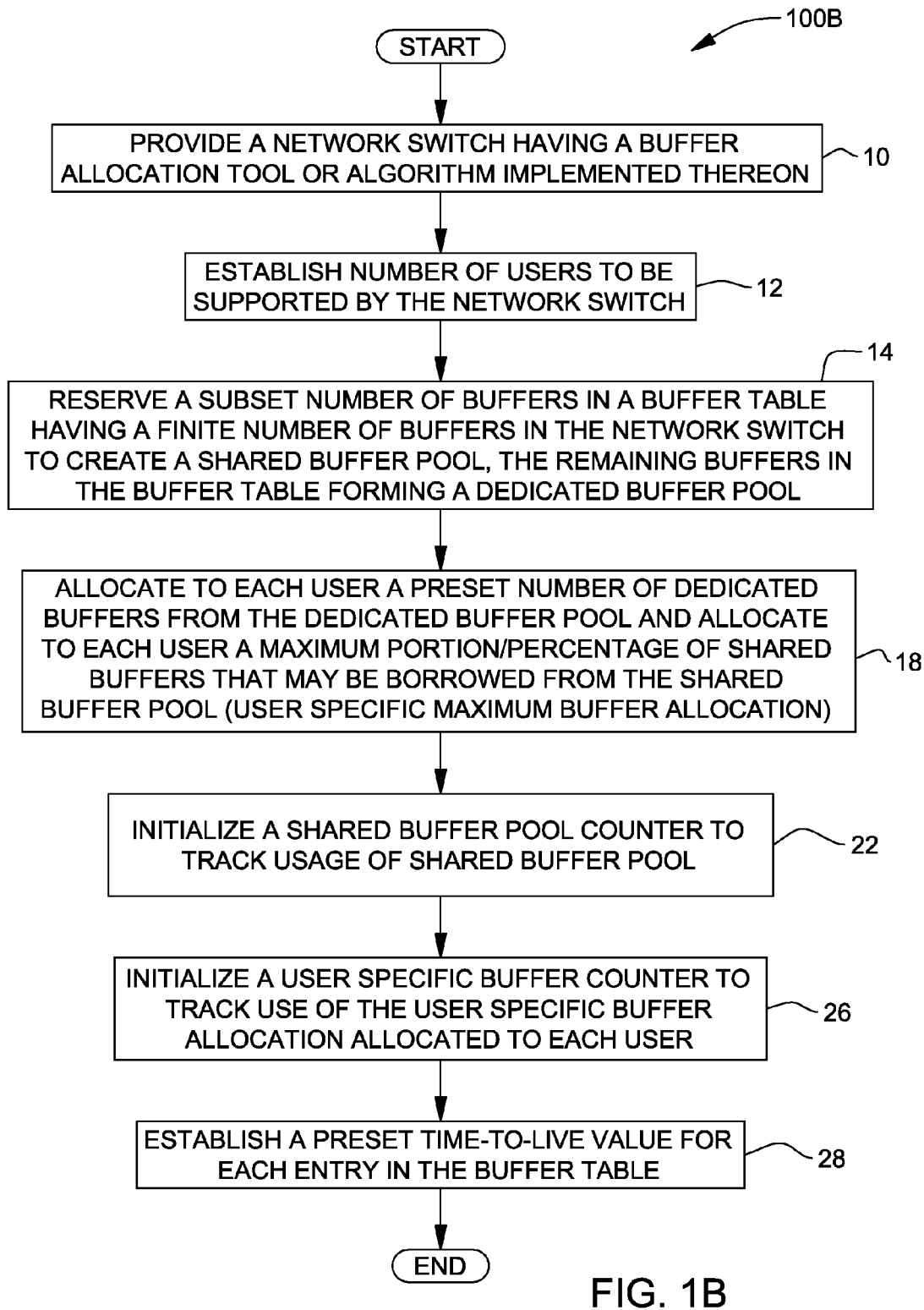
FIG. 1B depicts a flowchart outlining the steps for setting up a process for equitably sharing a CAM table in a network switch that is to be shared by multiple users, in accordance with an embodiment of the present invention.

In one embodiment, the invention provides a method for equitable sharing of buffers and/or for managing buffers in a network switch between a plurality of users of the network switch, particularly, in an on-demand environment. In particular, the invention provides a method for managing a data table or address table or CAM (Content Addressable Memory) table in a network switch that ensures that the finite number of buffers in the CAM table is shared fairly between the multiple users of the network switch, thus, preventing any single user from taking over all buffers in the CAM table or flooding the CAM table. The CAM table in a network switch comprises a pool of buffers or memory that contains information, such as, the MAC (Media Access Control) addresses available on a given physical port of a switch. When a network switch receives a packet or a frame, the switch looks in the CAM table for the destination MAC address. If an entry exists for the MAC address in the CAM table, the switch forwards the packet to the port designated in the CAM table for that MAC address. Reference is now made to FIGS. 1A and 1B, which outline different embodiments for setting up a method for equitable sharing of CAM table buffers in a network switch.

Turning to FIG. 1A, reference numeral 100A outlines the steps for setting up a method or embodiment for equitable sharing of buffers in a network switch. In an embodiment, the method starts with providing in step 10 a network switch that has implemented thereon a buffer allocation tool or algorithm, which is discussed herein below with respect to FIGS. 4A, 4B and 5. In step 12, the buffer allocation tool in the network switch is used to establish the total number of users to be supported by the network switch. In an embodiment, a user or customer is defined as a VLAN (Virtual Local Area Network), where one or more physical ports are mapped to a user, as shown in FIGS. 4A and 4B. It is understood that although the inventive method or process is described herein in terms of a user being defined as a VLAN, the method can be applied to a user that is mapped to a single physical port. Accordingly, in step 12, each customer gets a VLAN assigned and each VLAN gets mapped to one or more physical ports on the network switch. As such one or more VLANs may belong to a single user or customer, however, a physical port may belong to only one VLAN. Alternatively, in another embodiment, a user is defined as a single port on the network switch, in which case the user is mapped to a physical port. Further, as shown in FIG. 1A, the buffer allocation tool or algorithm in the network switch is applied to reserve, in step 14, a subset number of buffers in a buffer table or CAM table in the network switch, which has a finite number of buffers to create a shared buffer pool, with the remaining buffers in the finite number of buffers forming a dedicated buffer pool. Further, in step 16, the buffer allocation tool or algorithm is applied to allocate to each user a preset number of dedicated buffers from the dedicated buffer pool (also referred to as "user specific dedicated buffer allocation"). However, the buffers reserved in the shared pool in step 14 are available to any of the users when a user has used its share of allocated dedicated buffers. In an embodiment, the number of dedicated buffers allocated to each user is equal, thus, for instance, if there are 10 users or customers to be supported by the network switch and if there are 100 buffers in the dedicated buffer pool, then each user is assigned 10 dedicated buffers. Alternatively, the buffer allocation tool or algorithm may be applied, such that, a different number of dedicated buffers may be allocated to each of the users based on some relevant criteria. Further, the buffer allocation tool is applied to initialize, in step 22, a shared buffer pool counter that tracks use of the shared buffer pool reserved in step 14. Additionally, the buffer allocation tool is applied to initialize, in step 24, for each user a counter to track use of the buffers used by a user (also referred to as "user specific buffer counter"). In particular, the user specific buffer counter tracks both the buffers allocated from the dedicated buffer pool and the use of buffers from the shared buffer pool by a user. Further, in step 28, the buffer allocation tool in the network switch is applied to establish a preset time-to-live value for each entry in the buffer table or CAM table in the network switch, ending the setup process. In particular, when the time-to-live value for an entry expires, the buffer may be returned for use by a user, as further discussed herein below with respect to FIG. 3. It is understood that other configurable parameters may be setup in the initial setup for utilizing the buffer allocation scheme.

Turning to FIG. 1B, reference numeral 100 outlines the steps for setting up another method or embodiment for equitable sharing of buffers in a network switch, particularly, in an on-demand environment. The steps in FIG. 1B that are similar to FIG. 1A are labeled with the same reference numerals, whereas, the steps that are different from FIG. 1A have different reference numerals. In the embodiment shown in FIG. 1B, the method starts with providing in step 10 a network switch that has implemented thereon a buffer allocation tool or algorithm, again, which is discussed herein below with respect to FIGS. 4 and 5. In step 12, the buffer allocation tool in the network switch is used to establish the total number of users (that is, ports or VLANs) to be supported by the network switch, such that, the users are mapped to a port on the network switch. Further, in step 14, as shown in FIG. 1B, the buffer allocation tool or algorithm in the network switch is applied to reserve, a subset number of buffers from the finite number of buffers in the buffer table or CAM table in the network switch for creating a shared buffer pool, with the remaining buffers in the finite number of buffers forming a dedicated buffer pool. Further, in step 18, the buffer allocation tool is applied to allocate to each user a preset number of dedicated buffers from the dedicated buffer pool (also referred to as "user specific dedicated buffer allocation") and, further, to allocate to each user a maximum portion or percentage of the shared buffers that a user may borrow from the shared buffer pool reserved in step 14 ("user specific shared buffer allocation"). The total allocation of both the dedicated buffers allocated to a user and the percentage or portion of the shared buffers allocated to a user is referred to as the "user specific maximum buffer allocation"). For instance, if there are 10 users or customers to be supported by the network switch and if there are 100 dedicated buffers in the dedicated buffer pool and 50 shared buffers in the shared buffer pool (that is, a total of 150 buffers in the CAM table), then in an embodiment, each user can be assigned 10 dedicated buffers each from the dedicated buffer pool (100 dedicated buffers in total). Alternatively, in an embodiment, the buffer allocation tool or algorithm may be applied, such that, a different number of dedicated buffers are allocated to each of the users based on some relevant criteria. However, going back to the embodiment where equal numbers of the dedicated buffers from the dedicated buffer pool are allocated to each user (that is, 10 dedicated buffers), if, for instance, a user is allowed to borrow up to 50% (that is, no more than 50%) of the 50 shared buffers available in the shared buffer pool, then the user specific maximum buffer allocation is 35, that is 10 dedicated buffers and up to 25 shared buffers. Again, the portion or percentage allocated to a user may be unequal based on some other relevant criteria. Further, the buffer allocation tool is applied to initialize, in step 22, a shared buffer pool counter that tracks use of the shared buffer pool reserved in step 14. Additionally, the buffer allocation tool is applied to initialize, in step 26, a counter (also referred to as "user specific buffer counter") for each user that tracks use of the buffers used by the user, in particular, both the dedicated buffers and the number of shared buffers used by a user based on the maximum percentage of buffers allocated to a user from the shared buffer pool, that is, the user specific maximum buffer allocation in step 18. Further, in step 28, the buffer allocation tool in the network switch is applied to establish a preset time-to-live value for each entry in the buffer table or CAM table in the network switch, ending the setup process. In particular, when the time-to-live value for an entry expires, the buffer may be returned for use by a user, as further discussed herein below with respect to FIG. 3. Again, it is understood that other configurable parameters may be setup in the initial setup for utilizing the buffer allocation scheme.

Figure 2A:
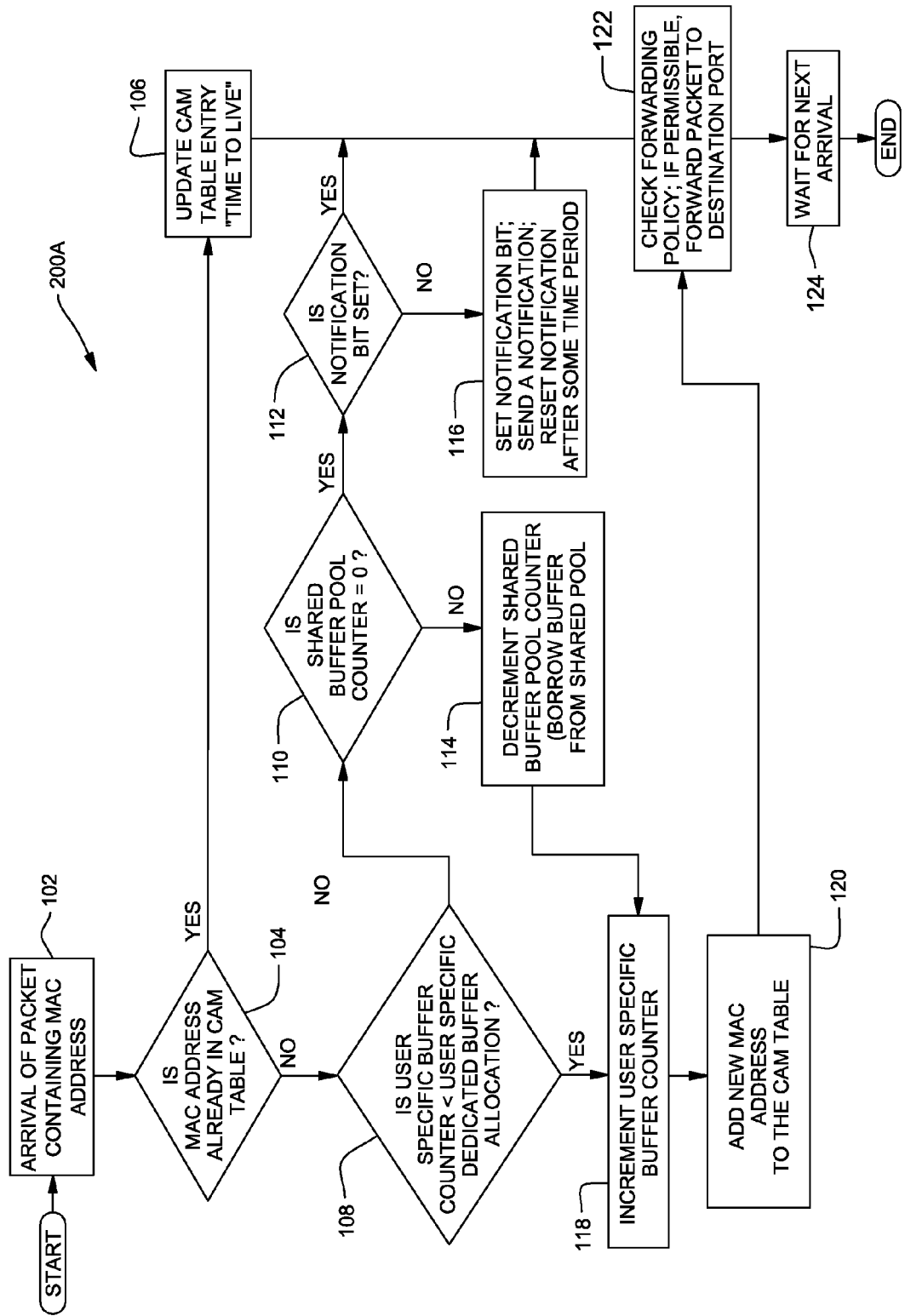
FIG. 2A depicts a flowchart outlining the steps involved in CAM (content addressable memory) allocation of CAM table buffers in a network switch shared by a plurality of users, in accordance with an embodiment of the present invention.
Figure 2B:
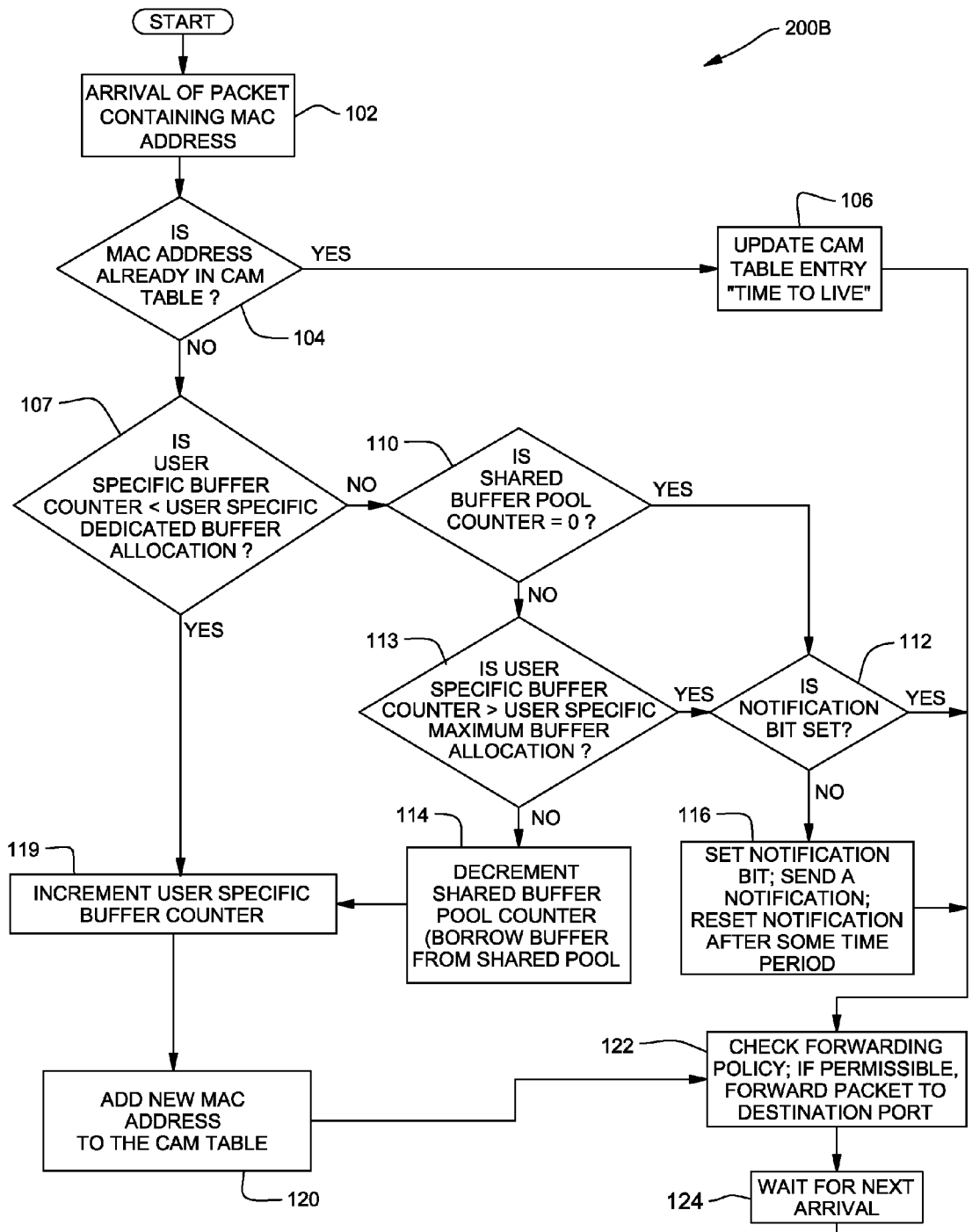
FIG. 2B depicts a flowchart outlining the steps involved in CAM (content addressable memory) allocation of CAM table buffers in a network switch shared by a plurality of users, in accordance with an embodiment of the present invention.

Reference is now made to FIGS. 2A and 2B, which outline different embodiments for allocating buffers in a CAM table. In particular, FIG. 2A represents an embodiment of a method of allocating buffers in a CAM table, corresponding to the embodiment of the initial setup outlined in FIG. 1A, whereas, FIG. 2B corresponds to the embodiment of the initial setup outlined in FIG. 1B. Turning to FIG. 2A, the method 200A of allocating CAM table buffers in a CAM table begins with step 102, with the arrival of a packet or frame from a user that contains a MAC (Media Access Control) address, which is received by a physical port in the network switch. Each packet has a source address and a destination address, where the source address is used to learn and populate the CAM table and where the destination address is used to forward the packet. The user or customer is the one that sent the packet. CAM table entries corresponds to addresses that are behind each physical port. So, for example, the CAM table may have MAC addresses 1 and 2 that correspond to physical port 10. So, when the switch gets a packet with a destination MAC address 1 or 2, it will forward the packet to physical port 10. In particular, the switch has already learned that MAC addresses 1 and 2 are behind physical port 10 by inspecting the source address of packets being received from physical port 10. Referring to FIG. 2A, the buffer allocation tool or algorithm determines in step 104, whether the destination MAC address is already listed in the CAM table in the network switch. If the buffer allocation tool determines that the destination MAC address is already listed in the CAM table, then the buffer allocation tool updates in step 106 the CAM table time-to-live value assigned to that MAC address entry. Further, in step 122, the buffer allocation tool checks any forwarding policy or rule before forwarding the packet. Thus, if permissible per the forwarding policy or rule, the packet is forwarded in step 122 to the destination port. The buffer allocation tool then waits for the next packet to arrive in step 124, ending the process. However, going back to step 104, if the buffer allocation tool determines that the destination MAC address is not listed in the CAM table, then the buffer allocation tool or algorithm determines in step 108, for the specific user or customer associated with the source MAC address, whether or not the user specific buffer counter (that is, the counter that keeps a running tally of the number of buffers being used by a user) is less than the user specific dedicated buffer allocation (that is, the preset number of dedicated buffers allocated to the user from the dedicated buffer pool). For example, if there are 100 dedicated buffers in the dedicated buffer pool and if there are 50 shared buffers in the shared buffer pool, each user may be allocated 10 dedicated buffers from the dedicated buffer pool. Further, in this embodiment, a user is not allocated any set numbers of buffers from the shared buffer pool, so that any user can borrow up to the maximum number of available shared buffers in the shared buffer pool, so in the example a user may borrow up to 50 shared buffers upon using up all the 10 dedicated buffers that are allocated. So in step 108 the buffer allocation tool first determines whether or not a user has used up all the 10 dedicated buffers that have been allocated to the user by comparing the number indicated by the user specific buffer counter (initialized in step 24 of FIG. 1A, which keeps a running tally of buffers used by a user) to the user specific dedicated buffer allocation, namely, 10. If it is determined that the user specific buffer counter is less than the user specific dedicated buffer allocation in step 108, that is, the user has not used up all of the dedicated buffers allocated, then the buffer allocation tool increments in step 118 the user specific buffer counter by one and adds the new MAC address to the CAM table in the network switch in step 120. Further, in step 122, the buffer allocation tool checks any forwarding policy or rule before forwarding the packet. Thus, if permissible per the forwarding policy or rule, the packet is forwarded in step 122 to the destination port. The buffer allocation tool then waits for the next packet to arrive in step 124, ending the process. However, going back to step 108, if the user specific buffer counter is not less than the user specific dedicated buffer allocation, that is, that the user has used up all the allocated dedicated buffers, then the buffer allocation tool determines in step 110 whether or not the shared buffer pool counter (that is, the running tally of the number of shared buffers remaining in the shared buffer pool) is equal to zero. If it is determined that the shared buffer pool counter is equal to zero, that is, there are no more shared buffers remaining in the shared buffer pool and that no shared buffers can be borrowed from the shared buffer pool, then in step 112, the buffer allocation tool determines whether or not the notification bit has been set. If it is determined that the notification bit has been set in step 112, this indicates that a prior notification has already been sent to a network manager or an administrator regarding the shared buffer pool usage. Accordingly, in step 122, the buffer allocation tool checks any forwarding policy or rule before forwarding the packet. Thus, if permissible per the forwarding policy or rule, the packet may still be forwarded in step 122 to the destination port and, if not, the packet is not forwarded to the destination port. The buffer allocation tool then waits for the next packet to arrive in step 124, ending the process. Going back to step 112, if it is determined that the notification bit has not been set, the buffer allocation tool sets the notification bit, for instance, by setting a flag to yes, and the buffer allocation tool sends a notification to a network manager or an administrator regarding the buffers in the shared buffer pool being used up, so that a network manager or an administrator can take appropriate action, such as, delete the entries in some of the buffers, etc. In an embodiment, the notification bit is reset after some preset time period, so that future notifications can be sent to the network manager or the administrator after the elapsed time period. After the notification is sent in step 116, in step 122, the buffer allocation tool checks any forwarding policy or rule before forwarding the packet. Thus, if permissible per the forwarding policy or rule, the packet may still be forwarded in step 122 to the destination port and, if not, the packet is not forwarded to the destination port. The buffer allocation tool then waits for the next packet to arrive in step 124, ending the process. However, if the buffer allocation tool determines in step 110 that the shared buffer pool counter is not equal to zero, that is, there are still some shared buffers remaining in the shared buffer pool, then in step 114, the buffer allocation tool decrements in step 114 the shared buffer pool counter by one and increments in step 118 the user specific buffer counter by one (to track the user's usage of the buffers) and allows the user to borrow a shared buffer from the shared buffer pool. Accordingly, the buffer allocation tool adds the new MAC address to the CAM table in step 120, checks any forwarding policy or rule in step 122 before forwarding the packet to a destination port. If the forwarding policy permits forwarding of the packet, then the buffer allocation tool forwards the packet, if not, the buffer allocation tool does not forward the packet to the destination port and waits in step 124 for the next packet to arrive, ending the process.

Turning to FIG. 2B, the method 200B represents another embodiment of a method of allocating buffers in a CAM table, corresponding to the embodiment of the initial setup outlined in FIG. 1B. The steps in FIG. 2B that are similar to FIG. 2A are labeled with the same reference numerals, whereas, the steps that are different from FIG. 2A have different reference numerals. The method of allocating CAM table buffers in a CAM table in FIG. 2B begins with step 102, with the arrival of a packet or frame from a user that contains a MAC (Media Access Control) address, which is received by a physical port in the network switch. Each packet has a source address and a destination address, where the source address is used to learn and populate the CAM table and where the destination address is used to forward the packet. The buffer allocation tool or algorithm determines in step 104, whether the destination MAC address is already listed in the CAM table in the network switch. If the buffer allocation tool determines that the destination MAC address is already listed in the CAM table, then the buffer allocation tool updates in step 106 the CAM table time-to-live value assigned to that MAC address entry. Further, in step 122, the buffer allocation tool checks any forwarding policy or rule before forwarding the packet. Thus, if permissible per the forwarding policy or rule, the packet is forwarded in step 122 to the destination port. The buffer allocation tool then waits for the next packet to arrive in step 124, ending the process. However, going back to step 104, if the buffer allocation tool determines that the destination MAC address is not listed in the CAM table, then the buffer allocation tool or algorithm determines in step 107 for the specific user or customer associated with the source MAC address whether or not the user specific buffer counter (that is, the counter that keeps a running tally of the total number of buffers being used by a user both from the dedicated buffer pool and the shared buffer pool) is less than the user specific dedicated buffer allocation (that is, the preset number of dedicated buffers allocated to the user from the dedicated buffer pool in step 18 of FIG. 1B). For example, if there are 100 dedicated buffers in the dedicated buffer pool and if there are 50 shared buffers in the shared buffer pool, each user may be allocated 10 dedicated buffers from the dedicated buffer pool and, further, the user is allocated a portion or percentage of shared buffers from the shared buffer pool that the user may borrow from (allocated in step 18 of FIG. 1B). For instance, if the user is allowed to borrow 50% of shared buffers from the shared buffer pool, then in the example, the user is allocated 10 dedicated buffers and is allocated up to 25 shared buffers from the shared buffer pool, thus, the user specific maximum buffer allocation for the user is 35 buffers (that is, 10 (dedicated buffers)+25 (shared buffers)=35 buffers). So in step 107 the buffer allocation tool first determines whether or not a user has used up all the 35 buffers that have been allocated to the user by comparing the number indicated by the user specific buffer counter (initialized in step 26 of FIG. 1B, which keeps a running tally of total buffers used by a user) to the user specific maximum buffer allocation, namely, 35. If it is determined that the user specific buffer counter is less than the user specific dedicated buffer allocation in step 107, that is, the user has not used up all of the buffers allocated, then the buffer allocation tool increments in step 119 the user specific buffer counter by one and adds the new MAC address to the CAM table in the network switch in step 120. Further, in step 122, the buffer allocation tool checks any forwarding policy or rule before forwarding the packet. Thus, if permissible per the forwarding policy or rule, the packet is forwarded in step 122 to the destination port. The buffer allocation tool then waits for the next packet to arrive in step 124, ending the process. However, going back to step 107, if the user specific buffer counter is not less than the user specific dedicated buffer allocation, that is, that the user has used up all the allocated buffers, then the buffer allocation tool determines in step 110 whether or not the shared buffer pool counter (that is, the running tally of the number of shared buffers remaining in the shared buffer pool) is equal to zero. If it is determined that the shared buffer pool counter is equal to zero, that is, there are no more shared buffers remaining in the shared buffer pool and that no shared buffers can be borrowed from the shared buffer pool, then in step 112, the buffer allocation tool determines whether or not the notification bit has been set. If it is determined that the notification bit has been set in step 112, this indicates that a prior notification has already been sent to a network manager or an administrator regarding the shared buffer pool usage. Accordingly, in step 122, the buffer allocation tool checks any forwarding policy or rule before forwarding the packet. Thus, if permissible per the forwarding policy or rule, the packet may still be forwarded in step 122 to the destination port and, if not, the packet is not forwarded to the destination port. The buffer allocation tool then waits for the next packet to arrive in step 124, ending the process. However, going back to step 112, if it is determined that the notification bit has not been set, the buffer allocation tool sets the notification bit, for instance, by setting a flag to yes, and the buffer allocation tool sends a notification to a network manager or an administrator regarding the buffers in the shared buffer pool being used up, so that a network manager or an administrator can take appropriate action, such as, delete the entries in some of the buffers, etc. In an embodiment, the notification bit is reset after some preset time period, so that future notifications can be sent to the network manager or the administrator after the elapsed time period. After the notification is sent in step 116, in step 122, the buffer allocation tool checks any forwarding policy or rule before forwarding the packet. Thus, if permissible per the forwarding policy or rule, the packet may still be forwarded in step 122 to the destination port and, if not, the packet is not forwarded to the destination port. The buffer allocation tool then waits for the next packet to arrive in step 124, ending the process. Further, going back to step 110, if the buffer allocation tool determines that the shared buffer pool counter is not equal to zero, that is, there are still some shared buffers remaining in the shared buffer pool, then in step 113, the buffer allocation tool determines whether or not the user specific buffer counter (running tally of total buffers used by a user) is greater than the user specific maximum buffer allocation (preset buffers allocated to the user—in the above example, this number being 35). If the user specific buffer counter is not greater than the user specific maximum buffer allocation (that is, the user has not exceeded the total buffers allocated) and if there are still shared buffers remaining in the shared buffer pool, then the buffer allocation tool decrements in step 114 the shared buffer pool counter by one and allows the user to borrow a shared buffer from the shared buffer pool. Further, the buffer allocation tool increments in step 119 the user specific buffer counter by one to keep a running tally of the buffers being used by the user. Accordingly, the buffer allocation tool adds the new MAC address to the CAM table in step 120, checks any forwarding policy or rule in step 122 before forwarding the packet to a destination port. If the forwarding policy permits forwarding of the packet, then the buffer allocation tool forwards the packet, if not, the buffer allocation tool does not forward the packet to the destination port and waits in step 124 for the next packet to arrive, ending the process. Going back to step 113, if the user specific buffer counter is greater than the user specific maximum buffer allocation (that is, the user has used up all of its allocated buffers), then the buffer allocation tool determines whether or not the notification bit has been set. If it is determined that the notification bit has been set in step 112, this indicates that a prior notification has already been sent to a network manager or an administrator regarding the shared buffer pool usage. However, in step 112, if it is determined that the notification bit has not been set, the buffer allocation tool sets the notification bit, for instance, by setting a flag to yes, and the buffer allocation tool sends a notification to a network manager or an administrator regarding the user having reached its allocated buffer usage, so that a network manager or an administrator can take appropriate action, such as, notify the user, etc. In an embodiment, the notification bit is reset after some preset time period, so that future notifications can be sent to the network manager or the administrator after the elapsed time period. After the notification is sent in step 116, in step 122, the buffer allocation tool checks any forwarding policy or rule before forwarding the packet. Thus, if permissible per the forwarding policy or rule, the packet may still be forwarded in step 122 to the destination port and, if not, the packet is not forwarded to the destination port. The buffer allocation tool then waits for the next packet to arrive in step 124, ending the process.

Figure 3:
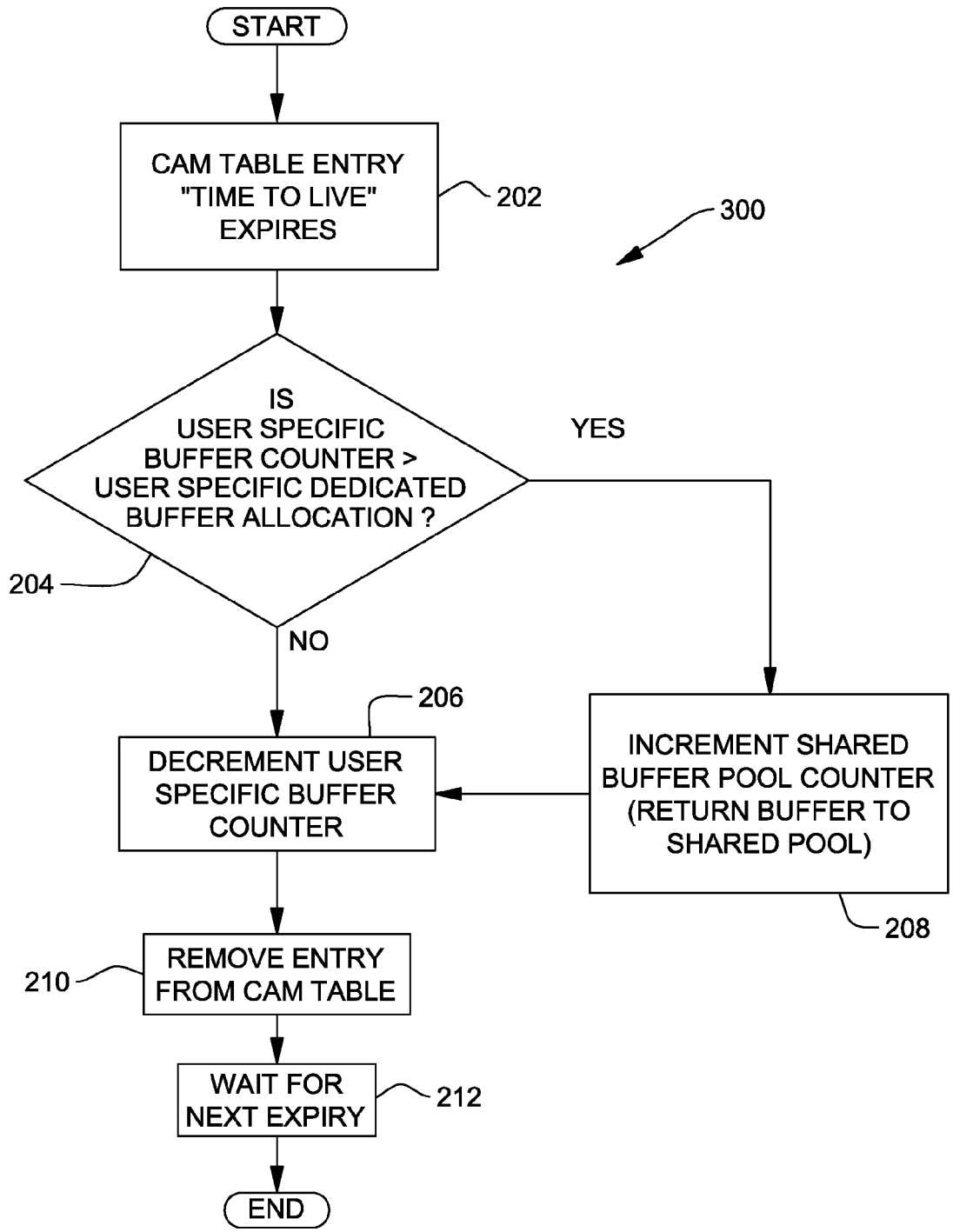
FIG. 3 depicts a flowchart outlining the steps involved in CAM (content addressable memory) deallocation of CAM table buffers in a network switch shared by a plurality of users, in accordance with an embodiment of the present invention.
Figure 4A:
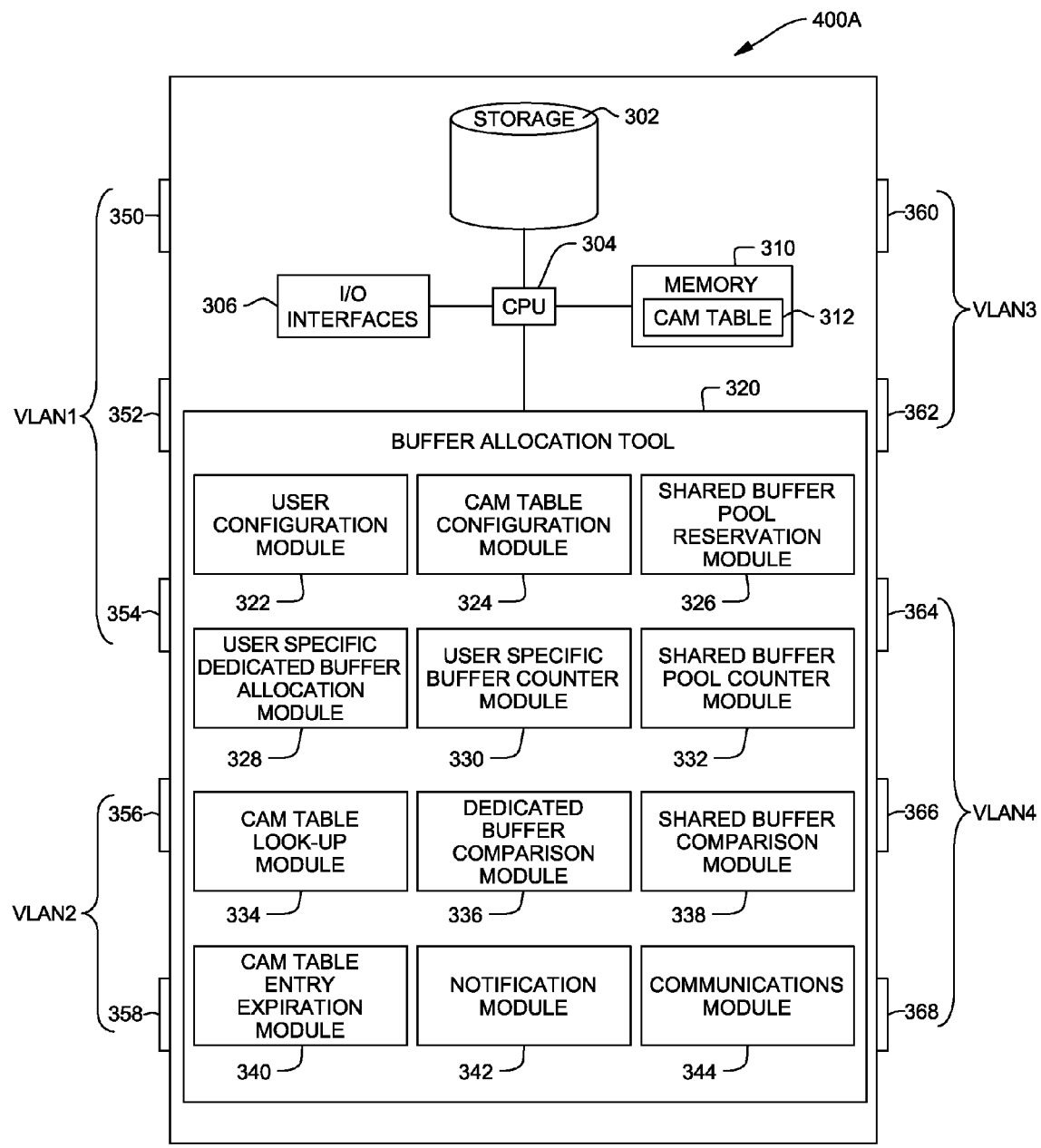
FIG. 4A is a schematic block system diagram illustrating an embodiment of a network switch having implemented thereon a buffer allocation tool for mitigating flooding of a CAM table in the network switch, in accordance with an embodiment of the present invention.
Figure 4B:
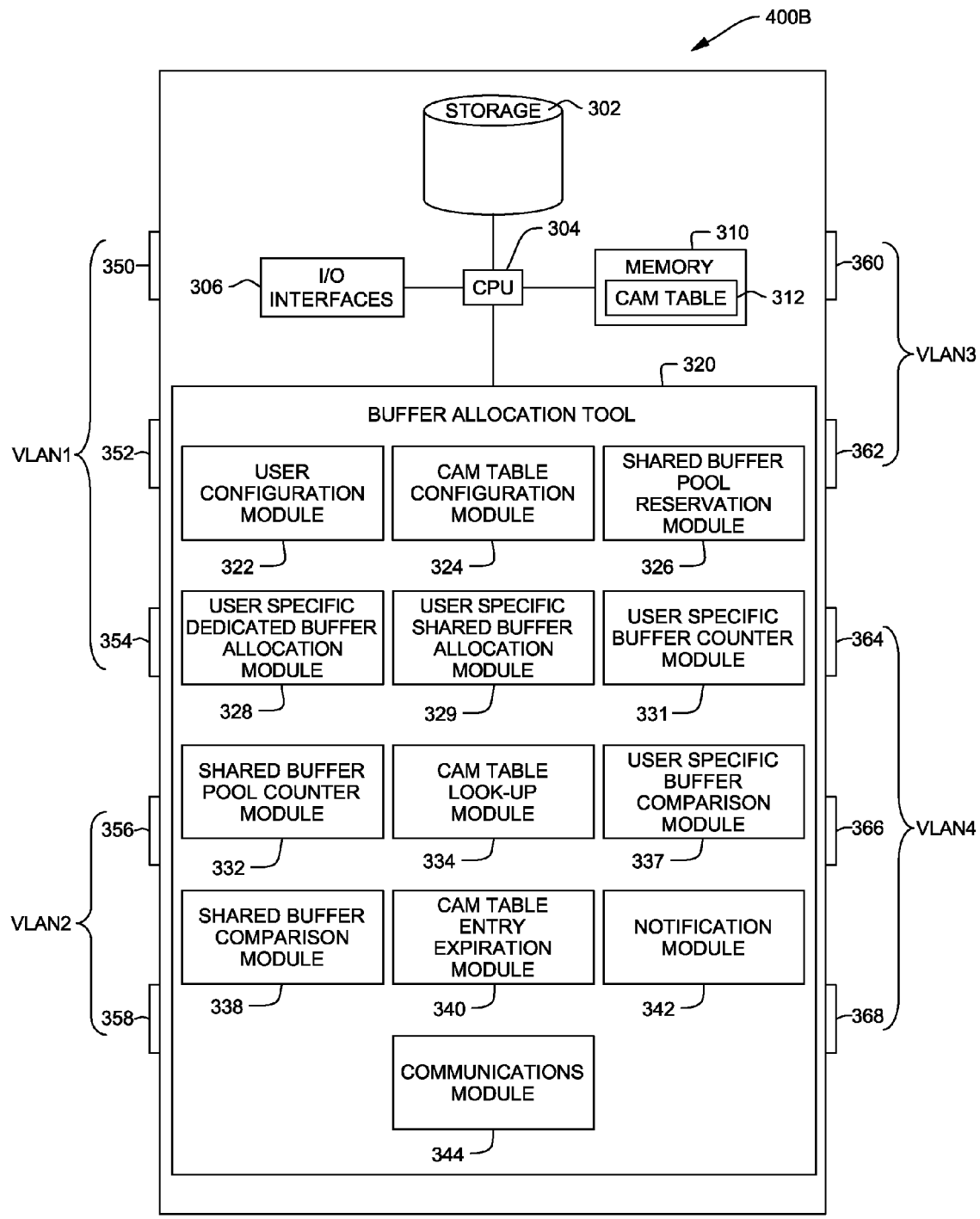
FIG. 4B is a schematic block system diagram illustrating an embodiment of a network switch having implemented thereon a buffer allocation tool for mitigating flooding of a CAM table in the network switch, in accordance with an embodiment of the present invention.

Reference is now made to FIG. 3, which outlines an embodiment for deallocating or reallocating buffers in a CAM table. In particular, FIG. 3 represents an embodiment of a method of deallocating buffers in a CAM table, corresponding to the embodiment of the initial setup outlined in both FIGS. 1A (where a user is allocated a preset number of dedicated buffers from the dedicated buffer pool and is not specifically allocated any shared buffers from the shared buffer pool) and 1B (where a user is allocated a preset number of dedicated buffers from the dedicated buffer pool and is allocated a preset percentage or portion of buffers from the shared buffer pool). Turning to FIG. 3, the method 300 of deallocating or reallocating CAM table buffers in a CAM table begins with step 202, when the time-to-live value for a CAM table entry expires. As mentioned herein above, the time-to-live value is a configurable parameter and can be adjusted accordingly. Accordingly, when the time-to-live value for a CAM table entry expires in step 202, the buffer allocation tool determines in step 204 whether or not the user specific buffer counter (that is, the running tally of the number of dedicated buffers being used by a user from the dedicated buffer pool) is greater than the user specific dedicated buffer allocation (that is, the preset number of dedicated buffers allocated to the user from the dedicated buffer pool). If it is determined that the user specific buffer counter is greater than the user specific dedicated buffer allocation, that is, that the user has used up all the dedicated buffers allocated to it, then the buffer allocation tool returns the buffer to the shared buffer pool. In particular, the buffer allocation tool increments in step 208 the shared buffer pool counter by one and returns the empty buffer to the shared buffer pool, given that the user has exceeded its allocated number of dedicated buffers. Further, the buffer allocation tool decrements the user specific buffer counter by one in step 206 given that the user is returning a buffer and removes in step 210, the CAM table entry from the CAM table and waits for the next CAM table entry to expire in step 212, ending the process. However, if it is determined in step 204 that the user specific buffer counter is not greater than the user specific dedicated buffer allocation, that is, that the user has not used up all the dedicated buffers allocated to it, then the buffer allocation tool decrements in step 206 the user specific buffer counter by one, that is, the buffer is returned to the user's total allocated share of buffers. Further, the buffer allocation tool removes in step 210, the CAM table entry from the CAM table and waits for the next CAM table entry to expire in step 212, ending the process.

Accordingly, the method of equitably sharing of CAM table buffers in a network switch in an on-demand environment can also prevent CAM table flooding, where a system can generate a large number of packets, each having a MAC address, so that all the buffers in the CAM table are exhausted. When the CAM table buffers are exhausted or filled up, MAC addresses cannot be inserted or added to the CAM table and the switch defaults to broadcasting the packet to all ports in order to deliver the packet to the right server or device. The attacking system can thereby eavesdrop on this traffic that is broadcasted to all ports. As such, in an embodiment, the buffer allocation tool or algorithm may be modified to reserve one or more MAC addresses on a given port, such that, a server producing a large number of MAC addresses would not be able to flush these reserved entries from the CAM table. Similarly, the method can also prevent a DHCP (Dynamic Host Configuration Protocol) starvation attack, where an attacker broadcasts a DHCP request having a spoofed or fake MAC address for obtaining an IP (Internet Protocol) address. If a large number of DHCP requests are sent, an attacker can exhaust the address spaces available to the DHCP servers for a given period of time, thus, creating a simple resource starvation attack. The attacker can then set up a rogue DHCP server on its system and respond to new DHCP requests from clients on the network. By placing a rogue DHCP server on the network, the attacker can provide clients with addresses and other network information. Since DHCP responses typically include default gateway and DNS (Domain Name Server) information, the attacker can supply their own system as the default gateway and DNS server resulting in a "man-in-the-middle" attack. Accordingly, the CAM table allocation scheme described herein above can be used to filter a DHCP request whenever the MAC address is not in the CAM table. Thus, by controlling the CAM table entries, DHCP request flooding can also be deterred.

In another embodiment, the invention provides a system for mitigating flooding of a data table or an address table or CAM (content addressable memory) table, in accordance with an embodiment of the invention. Reference is now made to FIGS. 4A and 4B, which illustrate different embodiments of a network switch having implemented thereon a buffer allocation tool for mitigating flooding of a CAM table in the network switch that has a finite number of buffers. Turning to FIG. 4A, FIG. 4A is a schematic block system diagram illustrating one embodiment of a network switch 400A having a buffer allocation tool or algorithm 420 implemented thereon that is configured to allocate the total available buffers in the CAM table equitably among the multiple users of the network switch in order to mitigate flooding of the CAM table by any one user of the network switch. In particular, the network switch 400A has an initial setup that corresponds to the flowchart shown in FIG. 1A, where a user is allocated a preset number of dedicated buffers from the dedicated buffer pool (the dedicated buffers for each user is tracked by the buffer allocation tool) and is not specifically allocated any shared buffers from the shared buffer pool (the shared buffer pool is also tracked), such that, a user who has used up all of its dedicated buffers may borrow all of the shared buffers that are available. In the embodiment shown in FIG. 4A, the network switch 400A comprises multiple physical ports 350, 352, 354, 356, 358, 360, 362, 364, 366 and 368. As such, each of these physical ports 350, 352, 354, 356, 358, 360, 362, 364, 366 and 368 may be connected to a computer or server belonging to a user or customer of the network switch. Further, in an embodiment, one or more physical ports in a switch may belong to or be mapped to a VLAN (Virtual Local Area Network), such as, VLAN 1, VLAN 2, VLAN 3 and VLAN 4. For instance, ports 350, 352 and 354, as shown, are mapped to VLAN 1, where VLAN 1 represents a user or customer. Further, as shown in FIG. 4A, physical ports 356 and 358 are mapped to VLAN 2, where VLAN 2 may represent the same user or customer as VLAN 1 or may represent a different user or customer. Additionally, physical ports 360 and 362 are mapped to VLAN 3 and physical ports 364, 366 and 368 are mapped to VLAN 4. Again, VLAN 3 may represent the same user or customer as one of the other VLANs (VLAN 1 and/or 2) or may represent a different user or customer. Similarly, VLAN 4 may represent the same user or customer as one of the other VLANs (VLAN 1 and/or 2 and/or 3) or may represent a different user or customer. Accordingly, each VLAN of the four VLANs 1-4 may represent a separate user or customer or there may be overlap where one or more VLANs may belong to a single user or customer. Further, as shown in FIG. 4A, the network switch 400A includes a central processing unit (CPU) 304, a local storage device 302, input/output (I/O) interfaces 306, and a memory 310. The CPU 304 is configured generally to execute operations within the network switch 400A and to run or execute the buffer allocation tool 320 implemented thereon in order to mitigate flooding of the CAM table by any one user of the network switch. The I/O interfaces 306, in one embodiment, is configured to connect a user or customer to the network switch 400A. In an embodiment, the local memory 310 is configured to store a CAM (content addressable memory) table 312 that stores the MAC (media access control) addresses corresponding to packets received by the network switch.

In one embodiment, as shown in FIG. 4A, the buffer allocation tool 320 which runs on the network switch 400A comprises a logic unit that contains a plurality of modules configured to functionally execute the necessary steps of mitigating flooding of the CAM table that has a finite number of buffers in the network switch 400A. In particular, the buffer allocation tool 320 includes a user configuration module 322, a CAM table configuration module 324, a shared buffer pool reservation module 326, a user specific dedicated buffer allocation module 328, a user specific buffer counter module 330, a shared buffer pool counter module 332, a CAM table look-up module 334 a dedicated buffer comparison module 336, a shared buffer comparison module 338, a CAM table entry expiration module 340, a notification module 342 and a communications module 344. The user configuration module 322 is configured to establish a maximum number of users to be supported by the network switch 400A and is further configured to map the users to the one or more of the physical ports (350, 352, 354, 356, 358, 360, 362, 364, 366 and 368) or to one of the VLANs, namely, VLAN 1 through VLAN 4 on the network switch 400A. The CAM table configuration module 324 is configured to establish a preset time-to-live value for entries entered into the CAM table. It is understood that other configurable parameters pertaining to the CAM table may be established or set in the CAM table configuration module 324. The shared buffer pool reservation module 326 is configured to reserve a subset of the total available buffers in the CAM table to create a shared pool of buffers; the remaining buffers forming or being designated as a dedicated buffer pool. The user specific dedicated buffer allocation module 328 is configured to allocate to each user a preset number of dedicated buffers from the dedicated buffer pool in the CAM table in the network switch 400A. The user specific buffer counter module 330 is configured to keep a running tally or count of the number of buffers used by a user, regardless if it is from the dedicated buffer pool or from the shared buffer pool. The shared buffer pool counter module 332 is configured to keep a running tally or count of the number of shared buffers available in the shared buffer pool. The CAM table look-up module 334 is configured to look up whether or not a MAC address for a packet received on a port is listed in the CAM table. The dedicated buffer comparison module 336 is configured to compare the value of the user specific buffer counter to the user specific dedicated buffer allocation to determine whether or not a user has exceeded its allocation of dedicated buffers. The shared buffer comparison module 338 is configured to compare the value of the shared buffer pool counter to the number of shared buffers remaining in the shared buffer pool in order to determine whether or not a user can borrow any shared buffers from the shared buffer pool.

The CAM table entry expiration module 340 is configured to return a buffer to the shared buffer pool upon the expiration of the time-to-live value for an entry in the CAM table. The notification module 342 is configured to send notification to a network manager when a user has exceeded all the dedicated buffers allocated to the user and there are no more buffers left in the shared buffer pool. Further, the notification module 342 is configured to track whether or not a previous notification has already been sent to the network manager before sending another notification. The communications module 344 is configured to permit communication between the various modules of the buffer allocation tool and the various other components of the network switch 400A, such as, storage 302.

Although, the method has been described in the above embodiments using the initial set up shown in FIGS. 1A and 1B, it is understood that other buffer allocation tool embodiments can be used for setting up the initial process. For instance, the buffer allocation tool could in addition to allocating to each user a preset number of dedicated buffers, also allocate a preset number of shared buffers from the shared buffer pool. As such, a dedicated buffer counter can be initialized for each user that tracks the dedicated buffers used by each user and a shared buffer counter can be initialized for each user that tracks the shared buffers used by each user, in addition to respective counters that track the dedicated buffer pool and the shared buffer pool. Similarly, the deallocation of the buffers can be fashioned to take account of the counter that tracks a user's specific shared buffer allocation in view of the counter that tracks a user's specific dedicated buffer allocation, such that, a buffer may be returned to a user's specific shared allocation instead of being returned to the shared buffer pool.

Turning to FIG. 4B, FIG. 4B is a schematic block system diagram illustrating one embodiment of a network switch 400B having a buffer allocation tool or algorithm 420 implemented thereon that is configured to allocate the total available buffers in the CAM table equitably among the multiple users of the network switch in order to mitigate flooding of the CAM table by any one user of the network switch. In particular, the network switch 400B has an initial setup that corresponds to the flowchart shown in FIG. 1B, where a user is allocated a preset number of dedicated buffers from the dedicated buffer pool and is allocated a portion or percentage of shared buffers from the shared buffer pool and where these two buffer allocations add up to or signify a user specific buffer allocation. In the embodiment, the user specific buffer allocation is tracked by the buffer allocation tool for each user in addition to the shared buffers remaining in the shared buffer pool. The buffer allocation tool modules in FIG. 4B that are similar to FIG. 4A are labeled with the same reference numerals, whereas, the modules that are different from FIG. 4A have different reference numerals. In the embodiment shown in FIG. 4B, the network switch 400B comprises multiple physical ports 350, 352, 354, 356, 358, 360, 362, 364, 366 and 368. As such, each of these physical ports 350, 352, 354, 356, 358, 360, 362, 364, 366 and 368 may be connected to a computer or server belonging to a user or customer of the network switch. Further, in an embodiment, one or more physical ports in a switch may belong to or be mapped to a VLAN (Virtual Local Area Network), such as, VLAN 1, VLAN 2, VLAN 3 and VLAN 4. For instance, ports 350, 352 and 354, as shown, are mapped to VLAN 1, where VLAN 1 represents a user or customer. Further, as shown in FIG. 4B, physical ports 356 and 358 are mapped to VLAN 2, where VLAN 2 may represent the same user or customer as VLAN 1 or may represent a different user or customer. Additionally, physical ports 360 and 362 are mapped to VLAN 3 and physical ports 364, 366 and 368 are mapped to VLAN 4. Again, VLAN 3 may represent the same user or customer as one of the other VLANs (VLAN 1 and/or 2) or may represent a different user or customer. Similarly, VLAN 4 may represent the same user or customer as one of the other VLANs (VLAN 1 and/or 2 and/or 3) or may represent a different user or customer. Accordingly, each VLAN of the four VLANs 1-4 may represent a separate user or customer or there may be overlap where one or more VLANs may belong to a single user or customer. Further, as shown in FIG. 4B, the network switch 400B includes a central processing unit (CPU) 304, a local storage device 302, input/output (I/O) interfaces 306, and a memory 310. The CPU 304 is configured generally to execute operations within the network switch 400A and to run or execute the buffer allocation tool 320 implemented thereon in order to mitigate flooding of the CAM table by any one user of the network switch. The I/O interfaces 306, in one embodiment, is configured to connect a user or customer to the network switch 400B. In an embodiment, the local memory 310 is configured to store a CAM (content addressable memory) table 312 that stores the MAC (media access control) addresses corresponding to packets received by the network switch.

In one embodiment, as shown in FIG. 4B, the buffer allocation tool 320 which runs on the network switch 400B comprises a logic unit that contains a plurality of modules configured to functionally execute the necessary steps of mitigating flooding of the CAM table that has a finite number of buffers in the network switch 400B. In particular, the buffer allocation tool 320 includes a user configuration module 322, a CAM table configuration module 324, a shared buffer pool reservation module 326, a user specific dedicated buffer allocation module 328, a user specific shared buffer allocation module 329, a user specific maximum buffer counter module 331, a shared buffer pool counter module 332, a CAM table look-up module 334 a user specific buffer comparison module 337, a shared buffer comparison module 338, a CAM table entry expiration module 340, a notification module 342 and a communications module 344. The user configuration module 322 is configured to establish a maximum number of users to be supported by the network switch 400B and is further configured to map the users to the one or more of the physical ports (350, 352, 354, 356, 358, 360, 362, 364, 366 and 368) or to one of the VLANs, namely, VLAN 1 through VLAN 4 on the network switch 400B. The CAM table configuration module 324 is configured to establish a preset time-to-live value for entries entered into the CAM table. It is understood that other configurable parameters pertaining to the CAM table may be established or set in the CAM table configuration module 324. The shared buffer pool reservation module 326 is configured to reserve a subset of the total available buffers in the CAM table to create a shared pool of buffers; the remaining buffers forming or being designated as a dedicated buffer pool. The user specific dedicated buffer allocation module 328 is configured to allocate to each user a preset number of dedicated buffers from the dedicated buffer pool in the CAM table in the network switch 400B. The user specific shared buffer allocation module 329 is configured to allocate a percentage or portion of shared buffers that a user may borrow from the shared buffer pool. The user specific maximum buffer counter module 331 is configured to keep a running tally or count of the number of buffers used by a user from both the dedicated buffers and the shared buffers allocated to the user. The shared buffer counter pool module 332 is configured to keep a running tally or count of the number of shared buffers available in the shared buffer pool. The CAM table look-up module 334 is configured to look up whether or not a MAC address for a packet received on a port is listed in the CAM table. The user specific buffer comparison module 337 is configured to compare the value of the user specific maximum buffer counter to the user specific dedicated buffer allocation to determine whether or not a user has exceeded its allocation of the dedicated buffers allotted. The shared buffer comparison module 338 is configured to compare the value of the shared buffer pool counter to the number of shared buffers remaining in the shared buffer pool in order to determine whether or not a user can borrow any shared buffers from the shared buffer pool, when the user specific dedicated buffer allocation for a user has been used up. The CAM table entry expiration module 340 is configured to return a buffer to the shared buffer pool upon the expiration of the time-to-live value for an entry in the CAM table. The notification module 342 is configured to send notification to a network manager when a user has exceeded all the dedicated buffers allocated to the user and there are no more buffers left in the shared buffer pool. Further, the notification module 342 is configured to track whether or not a previous notification has already been sent to the network manager before sending another notification. The communications module 344 is configured to permit communication between the various modules of the buffer allocation tool and the various other components of the network switch 400A, such as, storage 302.

In yet another embodiment, the invention provides a computer program product for equitable sharing of a data table or address table or CAM (Content Addressable Memory) table having a finite number of buffers among a plurality of users sharing a network switch. Preferably, the computer program product comprises a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can include an electronic, magnetic, optical, electromagnetic, infrared, or semiconductor system (or apparatus or device) or a propagation medium. More preferably, the computer-readable medium can include a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The computer program product further comprises first program instructions to reserve a subset number of buffers in an address table in a network switch, the subset number of buffers reserved forming a shared buffer pool and a remaining number of buffers in the address table forming a dedicated buffer pool, the address table storing therein a plurality of addresses corresponding to addresses available on respective ports in the network switch, each address of the plurality of addresses stored therein having a respective preset time-to-live value. Further, the computer program product comprises second program instructions to allocate to each user of a plurality of users a total number of buffers in the address table that comprises a preset number of buffers from the dedicated buffer pool and a preset percentage of buffers from the shared buffer pool. Furthermore, the computer program product comprises third program instructions to determine for an address in a packet sent by a respective user among the plurality of users, whether the respective user has exceeded the total number of buffers in the address table allocated and, if yes, to prevent the respective user from using any additional buffers in the address table, the third program instructions comprising instructions to send a notification when the respective user has exceeded the total number of buffers in the address table. In an embodiment, the second program instructions further comprise instructions to maintain for each user of the plurality of users a running tally of the total number of buffers used by the each user in the address table and to keep a running tally of buffers remaining in the shared buffer pool in the address table. In an embodiment, the third program instructions further comprise instructions to compare the running tally of the total number of buffers maintained for the respective user to the preset number of buffers allocated to the respective user from the dedicated buffer pool and, if the running tally of the total number of buffers used by the respective user exceeds the preset number of buffers allocated to the respective user from the dedicated buffer pool, to verify that the subset number of buffers in the shared buffer pool has not been exhausted before allowing the respective user to borrow a buffer from the shared buffer pool for adding the address in the address table. In an embodiment, if the running tally of the total number of buffers used by the respective user exceeds the preset number of buffers allocated to the respective user from the dedicated buffer pool and the subset number of buffers in the shared buffer pool has not been exhausted, the third program instructions further comprise instructions to decrease by one the running tally of buffers remaining in the shared buffer pool and to increase by one the running tally of the total number of buffers for the respective user. In an embodiment, if the running tally of the total number of buffers for the respective user is less than the total number of buffers allocated to the respective user from the dedicated buffer pool, the third program instructions further comprise instructions to determine to increment by one the running tally of the total number of buffers for the respective user and to add the address to the address table. In an embodiment, the third program instructions further comprise instructions to delete a respective address entered in a respective buffer, upon expiration of a respective preset time-to-live value for the respective address entered in the respective buffer in the address table and to return the respective buffer to the shared buffer pool. In an embodiment, a user comprises at least one of a port, a plurality of ports, a virtual local area network (VLAN) and a plurality of virtual local area networks (VLANs) and the data table comprises a CAM (Content Addressable Memory) table for storing one or more MAC (Media Access Control) addresses. Preferably, each of the first, second and third program instructions are stored on the computer readable medium.

Figure 5:
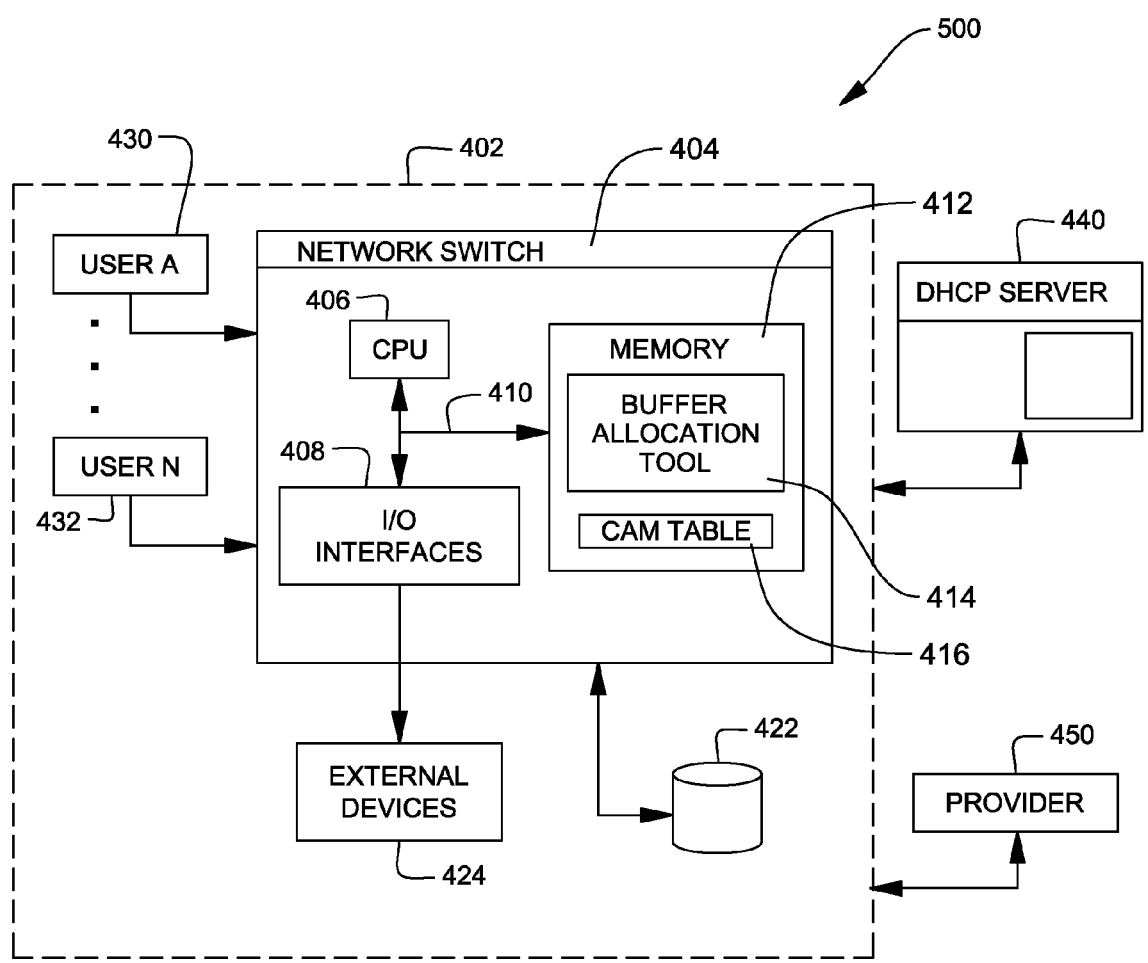
FIG. 5 is a schematic block system diagram illustrating an embodiment of a computer infrastructure comprising a network switch having a buffer allocation tool implemented therein for equitable sharing of CAM table buffers between a plurality of users of the network switch, in accordance with an embodiment of the present invention.

Referring now to FIG. 5, there is illustrated an embodiment of a computer system 500 for equitably sharing a CAM table having a finite number of buffers among a plurality of users of a network switch. As depicted, system 500 includes a computer infrastructure 402, which is intended to represent any type of computer architecture that is maintained in a secure environment (i.e., for which access control is enforced). As shown, infrastructure 402 includes a network switch 404 that typically represents a device that filters and forwards packets between network segments. It should be understood, however, that although not shown, other hardware and software components (e.g., additional computer systems, such as, routers, firewalls, etc.) could be included in the system 500.

In general, a user (such as, user A, reference numeral 430 through user N, reference numeral 432) may interface with the network switch 404 for utilizing one or more resources connected to the infrastructure 402, such as the DHCP (Dynamic Host Configuration Protocol) server 440 that a system or server connects to in order to request an IP (Internet Protocol) address. Similarly, an administrator for any of the users A through N (reference numeral 430 through reference numeral 432) can interface with the network switch 404 for supporting and/or configuring the network switch 404, such as, changing the mapping between a user and a physical port of the network switch or for upgrading the buffer allocation tool 414, etc. In general, the users could access infrastructure 402 directly, or over a network via interfaces (e.g., client web browsers) loaded on computerized devices (e.g., personal computers, laptops, handheld devices, etc.). In the case of the latter, the network can be any type of network such as the Internet or can be any other network, such as, a local area network (LAN), a wide area network (WAN), a virtual private network (VPN), etc. In any event, communication with infrastructure 402 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party, such as, a provider 450, or by an independent entity. Regardless, use of infrastructure 402 and the teachings described herein could be offered to the parties on a subscription or fee-basis. In either scenario, an administrator for the user A (reference numeral 430) through user N (reference numeral 432) could support and configure infrastructure 402, as mentioned herein above.

The network switch 404 is shown to include a CPU (hereinafter "processing unit 406"), a memory 412, a bus 410, and input/output (I/O) interfaces 408. Further, network switch 404 is shown in communication with external I/O devices/resources 424 and storage system 422. In general, processing unit 406 executes computer program codes, such as, the buffer allocation tool 414, which is configured to facilitate equitable sharing of a CAM table 416 within the network switch 404. While executing the buffer allocation tool 414, the processing unit 406 can read and/or write data, to/from memory 412, storage systems 422, and/or I/O interfaces 408. Bus 410 provides a communication link between each of the components in network switch 404. External devices 424 can include any devices that enable the network switch 404 to communicate with one or more other computing devices, such as, the DHCP server 440.

Computer infrastructure 500 is only illustrative of various types of computer infrastructures for implementing the invention. For example, in one embodiment, computer infrastructure 500 includes two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can include any specific purpose computing article of manufacture comprising hardware and/or computer program code for performing specific functions, any computing article of manufacture that includes a combination of specific purpose and general purpose hardware/software, or the like. In each case, the program code and hardware can be created using standard programming and engineering techniques, respectively. Moreover, processing unit 406 may include a single processing unit, or may include one or more processing units. Similarly, memory 412 and/or storage system 422 can include any combination of various types of data storage and/or transmission media. Further, I/O interfaces 408 can include any system for exchanging information with one or more external devices 424. Still further, it is understood that one or more additional components (e.g., system software, math co-processing unit, etc., not shown in FIG. 5) can be included in computer infrastructure 500. Similarly, it is understood that the one or more external devices 424 (e.g., a display) and/or storage system 422 could be contained within the network switch 404, and not externally as shown.

Storage system 422 can be any type of system (e.g., a database) capable of storing and/or updating information, for instance, information pertaining to users A through N sharing the network switch 404. Although not shown, additional components, such as cache memory, communication systems, system software, etc., may be incorporated into computer infrastructure 500.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for equitable sharing of buffers between a plurality of users of a network switch, said method comprising:

a processor of a computer system reserving a preset number of dedicated buffers for a respective user of the plurality of users and a subset number of shared buffers for all of said users in an address table in said network switch, said network switch comprising a plurality of ports, each port having a designated port number, said subset number of shared buffers forming a shared buffer pool for all of said users and said preset number of dedicated buffers in forming a dedicated buffer pool for said respective user, each shared buffer and each dedicated buffer in the address table configured to store a port number of a port of the plurality of ports and an associated address such that the network switch is configured to forward a packet received by the network switch to the port whose associated address in a buffer in the address table matches a destination address in the received packet;

said processor establishing, upon arrival at the network switch of a packet containing a destination address corresponding to said respective user, that said destination address is not listed in any buffer in said address table;

in response to said establishing, said processor determining whether or not an in-use number of said dedicated buffers being used by said respective user is less than said preset number of dedicated buffers allocated to said respective user if said processor determines that said in-use number of said dedicated buffers being used by said respective user is less than said preset number of dedicated buffers allocated to said respective user, then adding the destination address in the packet and an associated port of the plurality of ports to an unallocated dedicated buffer in said dedicated buffer pool;

if said processor determines that said in-use number of said dedicated buffers being used by said respective user is not less than said preset number of dedicated buffers allocated to said respective user, then either:

said processor determining that said subset number of buffers in said shared buffer pool is exhausted and sending to a network manager or an administrator a notification bit denoting that said subset number of buffers in said shared buffer pool is exhausted and not adding the destination address in the packet to any shared buffer in the shared buffer pool; or said processor determining that said subset number of buffers in said shared buffer pool is not exhausted and adding the destination address in the packet and an associated port of the plurality of ports to an unallocated shared buffer in said shared buffer pool.

2. The method of claim 1, wherein each user is a virtual local area network (VLAN) or a plurality of virtual local area networks (VLANs), and wherein said address table consists of a CAM (Content Addressable Memory) table for storing one or more MAC (Media Access Control) addresses.

3. The method of claim 1, wherein said processor determines that said in-use number of said dedicated buffers being used by said respective user is less than said preset number of dedicated buffers allocated to said respective user.

4. The method of claim 3, wherein the method comprises said processor incrementing by one a user-specific buffer counter that stores a count of said in-use number of said buffers being used by said respective user.

5. The method of claim 1, wherein said processor determines that said in-use number of said dedicated buffers being used by said respective user is not less than said preset number of dedicated buffers allocated to said respective user.

6. The method of claim 5, wherein said processor determines that said subset number of buffers in said shared buffer pool is exhausted and sends to said network manager or said administrator said notification bit denoting that said subset number of buffers in said shared buffer pool is exhausted and does not add the destination address in the packet to any shared buffer in the shared buffer pool.

7. The method of claim 5, wherein said processor determines that said subset number of buffers in said shared buffer pool is not exhausted and adds the destination address in the packet and an associated port of the plurality of ports to said unallocated shared buffer in said shared buffer pool and decrements by one said shared buffer counter that stores said count of said number of buffers in said shared buffer pool that is not exhausted.

8. The method of claim 7, wherein the method comprises said processor decrementing by one a shared buffer counter that stores a count of a number of buffers in said shared buffer pool that is not exhausted.

9. A computer program product for equitable sharing of buffers between a plurality of users of a network switch, said computer program product comprising:

a computer readable storage medium;

first program instructions to reserve a preset number of dedicated buffers for a respective user of the plurality of users and a subset number of shared buffers for all of said users in an address table in said network switch, said network switch comprising a plurality of ports, each port having a designated port number, said subset number of shared buffers forming a shared buffer pool for all of said users and said preset number of dedicated buffers forming a dedicated buffer pool for said respective user, each shared buffer and each dedicated buffer in the address table configured to store a port number of a port of the plurality of ports and an associated address such that the network switch is configured to forward a packet received by the network switch to the port whose associated address in a buffer in the address table matches a destination address in the received packet;

second program instructions to establish, upon arrival at the network switch of a packet containing a destination address corresponding to said respective user, that said destination address is not listed in any buffer in said address table;

third program instructions to, in response to said second program instructions establishing that said destination address is not listed in any buffer in said address table, determine whether or not an in-use number of said dedicated buffers being used by said respective user is less than said preset number of dedicated buffers allocated to said respective user;

fourth program instructions to, if said third program instructions determines that said in-use number of said dedicated buffers being used by said respective user is less than said preset number of dedicated buffers allocated to said respective user, add the destination address in the packet and an associated port of the plurality of ports to an unallocated dedicated buffer in said dedicated buffer pool;

fifth program instructions, if said third program instructions determines that said in-use number of said dedicated buffers being used by said respective user is not less than said preset number of dedicated buffers allocated to said respective user, to either:

determine that said subset number of buffers in said shared buffer pool is exhausted and send to a network manager or an administrator a notification bit denoting that said subset number of buffers in said shared buffer pool is exhausted and not add the destination address in the packet to any shared buffer in the shared buffer pool; or determine that said subset number of buffers in said shared buffer pool is not exhausted and add the destination address in the packet and an associated port of the plurality of ports to an unallocated shared buffer in said shared buffer pool, wherein the first program instructions, the second program instructions, the third program instructions, the fourth program instructions, and the fifth program instructions are stored on the computer readable storage medium for execution by a processor of a computer system via a computer readable memory of the computer system.

10. The computer program product of claim 9, wherein said third program instructions determine that said in-use number of said dedicated buffers being used by said respective user is less than said preset number of dedicated buffers allocated to said respective user.

11. The computer program product of claim 10, wherein said third program instructions increment by one a user-specific buffer counter that stores a count of said in-use number of said buffers being used by said respective user.

12. The computer program product of claim 9, wherein said third program instructions determine that said in-use number of said dedicated buffers being used by said respective user is not less than said preset number of dedicated buffers allocated to said respective user.

13. The computer program product of claim 12, wherein said fifth program instructions determine that said subset number of buffers in said shared buffer pool is exhausted and sends to said network manager or said administrator said notification bit denoting that said subset number of buffers in said shared buffer pool is exhausted and does not add the destination address in the packet to any shared buffer in the shared buffer pool.

14. The computer program product of claim 12, wherein said fifth program instructions determine that said subset number of buffers in said shared buffer pool is not exhausted and adds the destination address in the packet and an associated port of the plurality of ports to said unallocated shared buffer in said shared buffer pool and decrements by one said shared buffer counter that stores said count of said number of buffers in said shared buffer pool that is not exhausted.

15. The computer program product of claim 14, wherein said fifth program instructions decrement by one a shared buffer counter that stores a count of a number of buffers in said shared buffer pool that is not exhausted.

16. A computer system for equitable sharing of buffers between a plurality of users of a network switch, said computer system comprising:

a processor;

a computer readable memory;

a computer readable storage medium;

first program instructions to reserve a preset number of dedicated buffers for a respective user of the plurality of users and a subset number of shared buffers for all of said users in an address table in said network switch, said network switch comprising a plurality of ports, each port having a designated port number, said subset number of shared buffers forming a shared buffer pool for all of said users and said preset number of dedicated buffers forming a dedicated buffer pool for said respective user, each shared buffer and each dedicated buffer in the address table configured to store a port number of a port of the plurality of ports and an associated address such that the network switch is configured to forward a packet received by the network switch to the port whose associated address in a buffer in the address table matches a destination address in the received packet;

second program instructions to establish, upon arrival at the network switch of a packet containing a destination address corresponding to said respective user, that said destination address is not listed in any buffer in said address table;

third program instructions to, in response to said second program instructions establishing that said destination address is not listed in any buffer in said address table, determine whether or not an in-use number of said dedicated buffers being used by said respective user is less than said preset number of dedicated buffers allocated to said respective user;

fourth program instructions to, if said third program instructions determines that said in-use number of said dedicated buffers being used by said respective user is less than said preset number of dedicated buffers allocated to said respective user, add the destination address in the packet and an associated port of the plurality of ports to an unallocated dedicated buffer in said dedicated buffer pool;

fifth program instructions, if said third program instructions determines that said in-use number of said dedicated buffers being used by said respective user is not less than said preset number of dedicated buffers allocated to said respective user, to either;

determine that said subset number of buffers in said shared buffer pool is exhausted and send to a network manager or an administrator a notification bit denoting that said subset number of buffers in said shared buffer pool is exhausted and not add the destination address in the packet to any shared buffer in the shared buffer pool; or determine that said subset number of buffers in said shared buffer pool is not exhausted and add the destination address in the packet and an associated port of the plurality of ports to an unallocated shared buffer in said shared buffer pool, wherein the first program instructions, the second program instructions, the third program instructions, the fourth program instructions, and the fifth program instructions are stored on the computer readable storage medium for execution by the processor via the computer readable memory.

17. The computer system of claim 16, wherein said third program instructions determine that said in-use number of said dedicated buffers being used by said respective user is less than said preset number of dedicated buffers allocated to said respective user.

18. The computer system of claim 16, wherein said third program instructions determine that said in-use number of said dedicated buffers being used by said respective user is not less than said preset number of dedicated buffers allocated to said respective user.

19. The computer system of claim 18, wherein said fifth program instructions determine that said subset number of buffers in said shared buffer pool is exhausted and sends to said network manager or said administrator said notification bit denoting that said subset number of buffers in said shared buffer pool is exhausted and does not add the destination address in the packet to any shared buffer in the shared buffer pool.

20. The computer system of claim 18, wherein said fifth program instructions determine that said subset number of buffers in said shared buffer pool is not exhausted and adds the destination address in the packet and an associated port of the plurality of ports to said unallocated shared buffer in said shared buffer pool and decrements by one said shared buffer counter that stores said count of said number of buffers in said shared buffer pool that is not exhausted.

* * * * *